US010605254B2

(12) United States Patent
Ulrichsohn et al.

(10) Patent No.: US 10,605,254 B2
(45) Date of Patent: Mar. 31, 2020

(54) BEARING ELEMENT AND TURBOMACHINE WITH A BEARING ELEMENT

(71) Applicant: Rolls-Royce Deutschland Ltd & Co KG, Blankenfelde-Mahlow (DE)

(72) Inventors: Bjorn Ulrichsohn, Dresden (DE); Susanne Schruefer, Zossen (DE); Karl Schreiber, Am Mellensee (DE)

(73) Assignee: ROLLS-ROYCE DEUTSCHLAND LTD & CO KG, Blakenfelde-Mahlow (DE)

( * ) Notice: Subject to any disclaimer, the term of this patent is extended or adjusted under 35 U.S.C. 154(b) by 398 days.

(21) Appl. No.: 15/625,743

(22) Filed: Jun. 16, 2017

(65) Prior Publication Data
US 2017/0363100 A1 Dec. 21, 2017

(30) Foreign Application Priority Data

Jun. 20, 2016 (DE) .................. 10 2016 210 981

(51) Int. Cl.
*F04D 29/056* (2006.01)
*F01D 11/02* (2006.01)
(Continued)

(52) U.S. Cl.
CPC ......... *F04D 29/056* (2013.01); *C10M 103/04* (2013.01); *C10M 103/06* (2013.01); *F01D 5/3092* (2013.01); *F01D 11/02* (2013.01); *F01D 17/162* (2013.01); *F04D 29/023* (2013.01); *F04D 29/563* (2013.01); *F16C 33/1095* (2013.01); *F16C 33/128* (2013.01); *F16C 33/16* (2013.01); *C10M 2201/053* (2013.01); *C10M 2201/0603* (2013.01); *C10N 2240/02* (2013.01);
(Continued)

(58) Field of Classification Search
CPC .... F04D 29/056; F04D 29/023; F04D 29/563; F01D 17/162; F16C 33/10; F16C 33/12; F16C 33/16; C10M 103/04; C10M 103/06
See application file for complete search history.

(56) References Cited

U.S. PATENT DOCUMENTS

| 2002/0154991 | A1  | 10/2002 | Bowen |
| 2007/0160464 | A1* | 7/2007  | Lesnevsky ................ C23C 4/04 |
|              |     |         | 415/160 |
| 2012/0067101 | A1  | 3/2012  | Turley et al. |

FOREIGN PATENT DOCUMENTS

| AT | 237976  | 1/1965 |
| DE | 8610435 | 8/1986 |

(Continued)

OTHER PUBLICATIONS

German Search Report dated Mar. 7, 2017 for counterpart German Application No. DE 10 2016 210 981.2.
(Continued)

*Primary Examiner* — David E Sosnowski
*Assistant Examiner* — Sabbir Hasan
(74) *Attorney, Agent, or Firm* — Shuttleworth & Ingersoll, PLC; Timothy J. Klima

(57) ABSTRACT

A bearing element for at least one adjustable guide vane of a turbomachine, in particular an aircraft engine, is provided. The bearing element comprising a porous matrix made of carbon and/or graphite and at least one metallic phase or a metal salt that is at least partially arranged inside the pores of the matrix, so that what results is a metal-infiltrated or a metal-salt-infiltrated material.

20 Claims, 6 Drawing Sheets

(51) Int. Cl.

| | | |
|---|---|---|
| *F16C 33/10* | (2006.01) | |
| *F01D 5/30* | (2006.01) | |
| *F16C 33/12* | (2006.01) | |
| *F16C 33/16* | (2006.01) | |
| *C10M 103/04* | (2006.01) | |
| *C10M 103/06* | (2006.01) | |
| *F01D 17/16* | (2006.01) | |
| *F04D 29/02* | (2006.01) | |
| *F04D 29/56* | (2006.01) | |

(52) U.S. Cl.
CPC .... *C10N 2250/18* (2013.01); *F05D 2220/323* (2013.01); *F05D 2230/20* (2013.01); *F05D 2240/12* (2013.01); *F05D 2240/50* (2013.01); *F05D 2240/55* (2013.01); *F05D 2300/17* (2013.01); *F05D 2300/224* (2013.01); *F05D 2300/30* (2013.01); *F05D 2300/40* (2013.01); *F05D 2300/509* (2013.01); *F05D 2300/50212* (2013.01); *F05D 2300/603* (2013.01); *F16C 2202/52* (2013.01); *F16C 2204/04* (2013.01); *F16C 2206/06* (2013.01); *F16C 2360/23* (2013.01); *Y02T 50/672* (2013.01)

(56) References Cited

FOREIGN PATENT DOCUMENTS

| | | |
|---|---|---|
| DE | 102012202892 A1 | 8/2013 |
| DE | 102012202892 B4 * | 10/2015 |
| EP | 1806480 A1 | 7/2007 |

OTHER PUBLICATIONS

European Search Report dated Aug. 16, 2017 for counterpart European Application No. 17176088.7.

\* cited by examiner

BEARING ELEMENT AND TURBOMACHINE WITH A BEARING ELEMENT

REFERENCE TO RELATED APPLICATION

This application claims priority to German Patent Application No. 10 2016 210 981.2 filed on Jun. 20, 2016, the entirety of which is incorporated by reference herein.

BACKGROUND

The invention relates to a bearing element for at least one adjustable guide vane of a turbomachine and a turbomachine.

Adjustable guide vanes are used in turbomachines, in particular in compressors of aircraft engines, in order to ensure an optimal adjustment to the flow conditions. What is used here are polyamide-based bearing bushings which are abruptly subjected to a high degree of wear at a mechanical load above an application temperature which is relatively low for the compressor.

SUMMARY

Therefore, there is an objective to make available bearings that are still wear-resistant in particular at higher compressor temperatures, and that have a low friction coefficient.

This objective is achieved by means of a bearing element with features as described herein.

A temperature-resistant bearing for the adjustable guide vanes can particularly be created by using a porous matrix made of carbon and/or graphite, as well as at least one metallic phase or a metal salt that is at least partially arranged inside the pores of the matrix. What is thus used is a metal-infiltrated (by metal or metal salt) carbon and/or graphite material.

In one embodiment, the bearing element can consist of only the porous matrix of carbon and/or graphite and the at least one metallic phase or the metal salt. In that case, the bearing element would be formed in one piece from the metal-infiltrated material.

In another embodiment of the bearing element, an uncoated contact surface is provided for the at least one adjustable guide vane. This means that a reception area for a shaft end of the adjustable guide vane does not have to be separately coated. In another embodiment, the contact surface is embodied so as to be self-lubricating.

In one embodiment, the bearing element can be configured as an inner cover band (shroud) for a blade ring, or can be connected to the inner cover band.

In addition to the bearing characteristics of the at least one adjustable guide vane, the bearing element can also have further characteristics. Thus, it can for example also have an inflow surface for a seal, in particular a seal with sealing lips or a labyrinth seal. In this manner, the material characteristics of the bearing element can be used in a targeted manner for two different application purposes, namely for the bearing of the adjustable guide vanes and for the configuration of a seal. Here, the contact surface for bearing the at least one guide vane and the inflow surface for a seal can be arranged at substantially opposite sides of the bearing element.

In another embodiment of the bearing element, the metallic phase can comprise a non-ferrous metal, in particular copper, silver or antimony or a light metal, in particular aluminum, non-heat-treated aluminum or magnesium, or an alloy of these materials. A metallic phosphate, in particular aluminum phosphate, can for example be used as the metal salt.

In another embodiment, the matrix of carbon and/or graphite can have an interconnected structure with open pores.

In one embodiment, the ratio of the thermal expansion coefficients of the matrix and the at least one metallic phase is smaller than 0.6 in order to reduce thermal tensions.

It is not absolutely necessary for the metallic phase or the metal salt to be distributed inside the matrix in a homogenous manner. In one embodiment, it is possible that the metallic phase or the metal salt is distributed inside the bearing element in a manner corresponding to the load conditions, in particular in an inhomogeneous manner. Thus, the share of the metallic phase can be higher in highly loaded areas of the bearing element. Generally, a higher share of graphite/carbon allows for a minimized friction while a higher infiltration degree creates increased stability. In this manner, the optimal value that is respectively adjusted to the load can be adjusted.

In another embodiment, the bearing element is formed as a section of a ring or as a full ring with bearings for shaft ends of the adjustable guide vane.

The objective is achieved through a bearing element which can be manufactured by means of a liquid infiltration process, in particular by means of a spontaneous or forced liquid infiltration process.

The objective is also achieved through a method for manufacturing a bearing element in which a) a matrix of carbon and/or graphite is arranged in an infiltration device, and b) a liquid phase with a metal or a metal salt is introduced into the matrix, in particular as an external pressure or external force is being exerted.

The objective is also achieved through a turbomachine, in particular an aircraft engine.

BRIEF DESCRIPTION OF THE DRAWINGS

The invention is explained in connection with the exemplary embodiments that are shown in the Figures.

DETAILED DESCRIPTION

Figure 1:
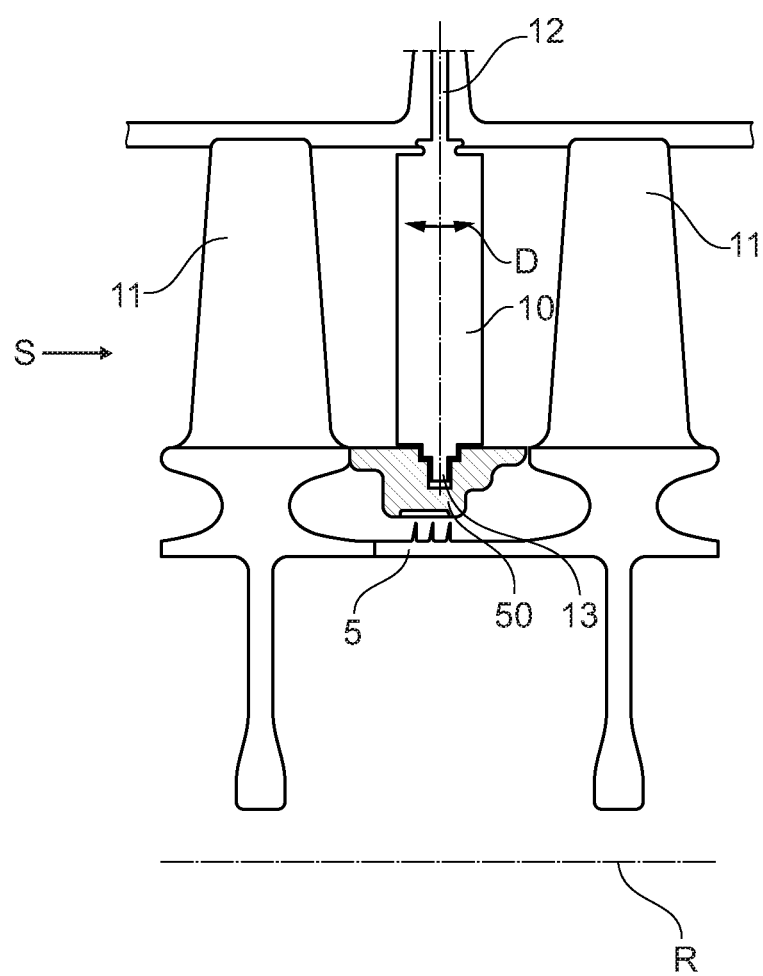
FIG. 1 shows a schematic side view of an embodiment of a bearing element of an adjustable guide vane in a compressor.

FIG. 1 shows a section through a blading of a turbomachine, namely of a compressor of an aircraft engine. The section shows an adjustable guide vane 10 (VSV, variable stator vane), in which one rotor blade 11 is arranged upstream and downstream, respectively. The flow direction S through the compressor is indicated by an arrow. The compressor rotates about a rotational axis R.

The adjustable guide vane 10 can be rotated in a per se known manner about its longitudinal axis (double arrow D)

depending on the required adjustment. At the radially outer end of the guide vane 10 (i.e., at the housing side), an adjustment device of the guide vane 10 is arranged, which is not shown here in more detail. Here, the adjustment device engages at an outer shaft end 12 of the guide vane 10. At that, the activation for the adjustment is for example performed by means of fuel control, i.e., through the thrust lever position as determined by the pilot, and, where appropriate, based on the sensor data, such as for example temperature data or rotational speed data.

A radially internally located (i.e., hub-side) shaft end 13 is mounted in a bearing element 50 comprising a material made of graphite 1, 2 that is infiltrated by metal or metal salt, with its embodiments being illustrated in the following (see in particular FIGS. 3 and 4).

Figure 2:
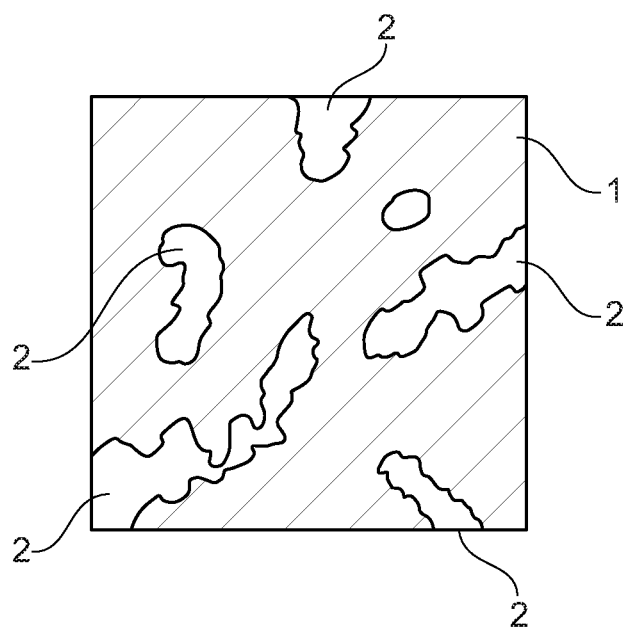
FIG. 2 shows a schematic rendering of a material with metal-infiltrated graphite.

FIG. 2 shows a sectional view through a graphite-infiltrated material which is used in the bearing element 50. Here, a phase of a metal or a metal salt 2 is deposited in a matrix 1 made of graphite. In the shown embodiment, the metallic phase 2 (which in this case is aluminum that has not been heat-treated) is formed with open pores and/or a branched structure in the material. Herein, only a section of the three-dimensionally branched structure is shown. Metal-infiltrated graphite (with metal or metal salt) is a composite material that combines the characteristics of the used materials or improves the characteristics of the matrix material.

This embodiment (and also the other ones) can be manufactured by means of a liquid infiltration process.

As for spontaneous liquid infiltration, the liquid metal 2, for example, is filled into the pores of the matrix 1, without any external pressure being applied. This may be carried out with a controlled temperature and gas atmosphere, for example.

As for forced liquid infiltration, an exterior driving force is for example used to press the liquid metal 2 into the matrix 1. This may for example be carried out by exerting an increased gas pressure inside a chamber inside of which the matrix is mounted. Thus, for example, a negative pressure may be applied to the side of the matrix 1, and an excess pressure may be applied to the side with the molten metal 2.

But the pressure may for example also be exerted by a mechanical appliance in which the liquid phase is pressed into the matrix 2 by means of a piston, for example.

Another possibility of forced liquid infiltration is the insertion of the liquid phase at centrifugal force. Since the liquid metallic phase 2 is conductive, also electromechanical forces are utilized to insert the metallic phase 2 into the matrix (Lorentz infiltration). Also, ultrasound can be used for the targeted creation of [cavitation bubbles] inside the matrix. After the bubbles have collapsed, the liquid metal 2 is driven into the matrix 1 by means of shock waves.

The material of the bearing elements 50, which is manufactured by means of one of the infiltration processes cited herein, clearly differs from sintered materials [with respect to its] structure.

By depositing light metals, such as for example aluminum or magnesium, in the pore system of the graphite material as a matrix 1, it is achieved, for one thing, that the density of the bearing element 50 is kept at a low level. For another thing, it is achieved through the suitable selection of the used raw materials as well as of their processing conditions that the characteristics of the manufactured composite material are influenced in a targeted manner. Thus, the stability of graphite can for example be increased by 100% through the infiltration with aluminum. In the case of an infiltration with aluminum, this mainly applies to the thermal conductivity, the thermal expansion, as well as the mechanical material characteristics.

Especially light metals, such as aluminum or magnesium, are suitable for being used as the material for the metallic phase 2. However, in general also non-ferrous metals such as copper, silver or antimony may be used. Likewise, non-ferrous metal alloys can be used. Also, a metal salt, such as for example a metallic phosphate, can be used. A bearing element 50 that comprises or consists of metal-infiltrated graphite has self-lubricating characteristics and can be used at temperatures of up to approximately 450° C.

In the embodiment that is shown here, the bearing element 50 consists of the metal-infiltrated material in its entirety. In other embodiments, only one area of the bearing element 50 is made of this material. It is also not absolutely necessary that the metallic phase 2 is distributed on average homogeneously throughout the bearing element 50. For example, it is possible to configure the areas located directly around the inner shaft end 13 in a different manner than other areas of the bearing element 50. This can be specifically controlled in the process of the infiltration of the matrix 1 with the metallic phase 2 or the metal salt, so that a distribution of the metallic phase 2 or of the metal salt inside the matrix 1 correspondingly to the load conditions may be achieved, for example. This would then result in an inhomogeneous distribution of the metallic phase 2 or of the metal salt as viewed across the entire bearing element 50.

Figure 3:
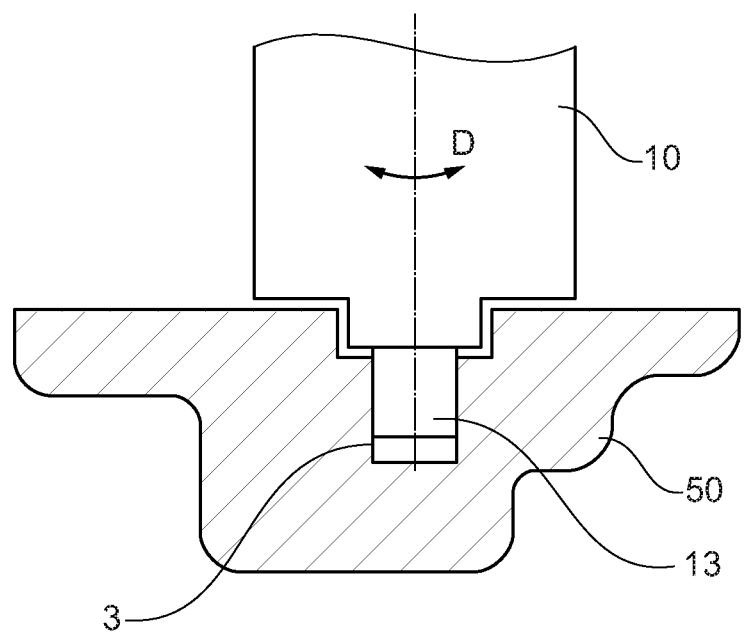
FIG. 3 shows a schematic rendering of an embodiment of a bearing element.

FIG. 3 shows, in a schematic manner, a sectional view through a bearing element 50 of metal-infiltrated graphite for an adjustable guide vane 10, i.e. a detail from FIG. 1. Here, the radially inner, i.e., the hub-side, shaft end 13 is guided directly inside the bearing element 50, i.e., a coating of the bearing element 50 or an inserted bushing is not necessary here due to the characteristics of the metal-infiltrated bearing. Thus, there is a direct contact between the material of the adjustable guide vane 10 and the bearing element 50 at the contact surface 3. The bearing element 50 thus provides a slide bearing function.

Figure 4:
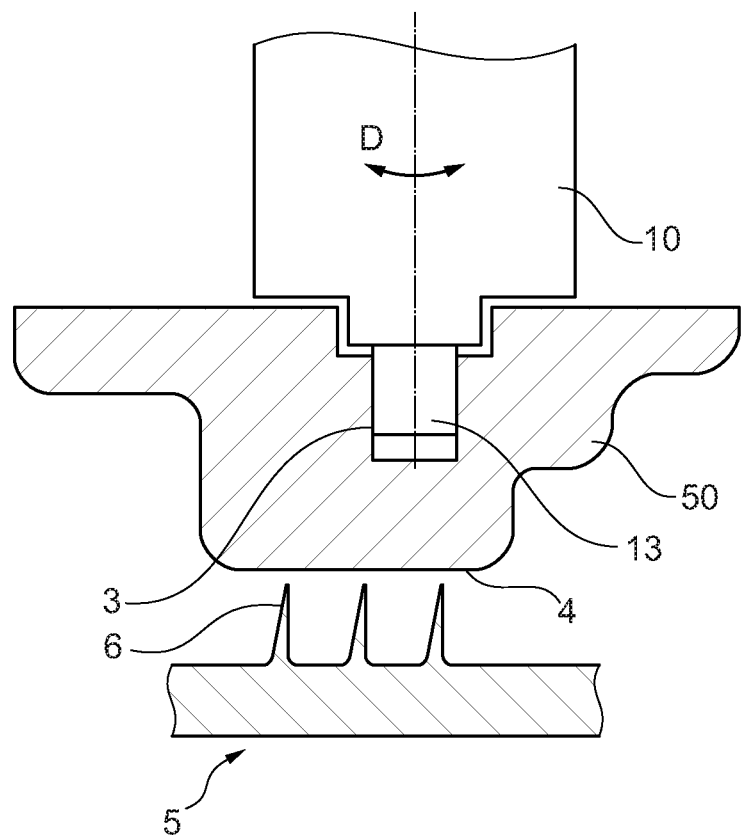
FIG. 4 shows a schematic rendering of another embodiment of a bearing element.

FIG. 4 shows another embodiment of a bearing element 50, in which the bearing of the adjustable guide vane 10 is embodied in a manner analogous to the embodiment according to FIG. 3, so that the respective description may be referred to.

An inflow surface 4 for a seal 5 with sealing lips 6 is arranged at the radially inner side of the bearing element 50 in FIG. 4. Here, the advantageous self-lubricating characteristics of the metal-infiltrated graphite are also used for the seal 5.

What is shown in FIGS. 1, 3 and 4 are respectively sectional views of the embodiments of the bearing element 50.

Figure 5:
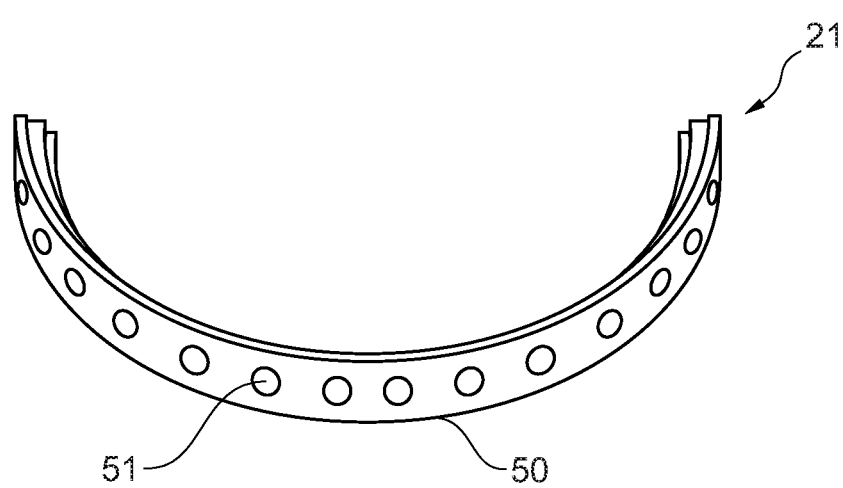
FIG. 5 shows a perspective view of a bearing element as a full ring for receiving adjustable guide vanes.

FIG. 5 shows a perspective view of a bearing element 50 that serves as the inner cover band 21 (shroud) for a stage of guide vanes 10, which are not depicted here. The bearing element 50 has a plurality of reception areas 51 inside of which the contact surface 3 for the radially inner shaft ends 13 of the adjustable guide vanes 10 can be arranged.

In the present case, the bearing element 50 is configured as a half ring. Alternatively, the bearing element 50 can also be configured as a full ring or as a section of a ring. These bearing elements 50 can then be arranged about the hub of the compressor.

Figure 6:
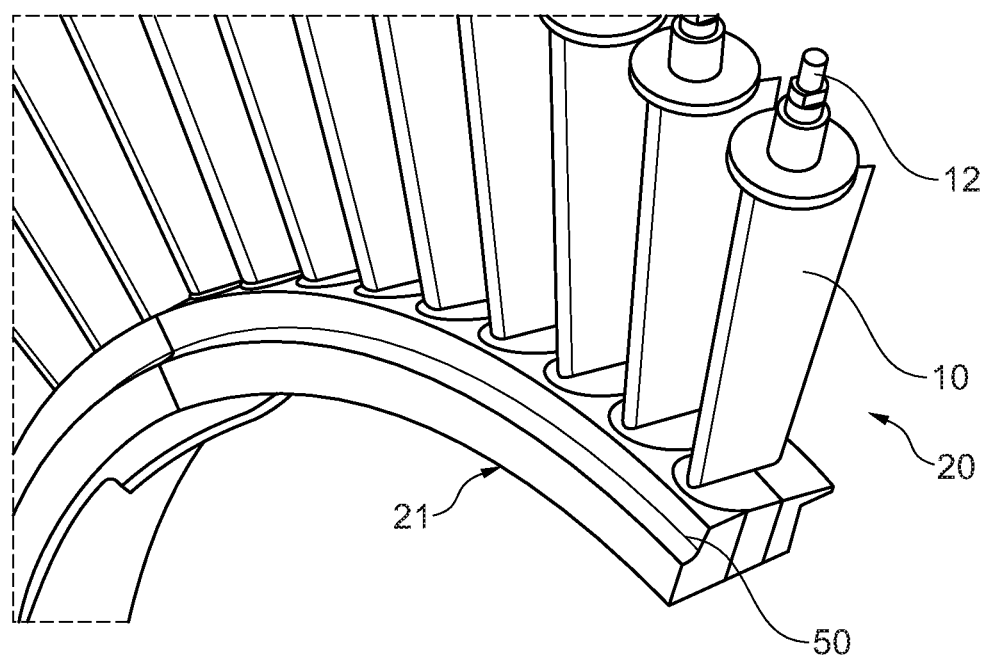
FIG. 6 shows a perspective view of an adjustable guide vane row in a bearing element.

In FIG. 6, a bearing element 50 is shown as an inner cover band 21 in a perspective section. Here, the inner cover band 21 is comprised of two sections of a ring. Openings for the plurality of adjustable guide vanes 10 forming the blade ring 20 are arranged inside the bearing element 50.

PARTS LIST

- 1 matrix made of carbon
- 2 metallic phase/metal salt
- 3 contact surface
- 4 inflow surface
- 5 seal
- 6 sealing lips
- 10 adjustable guide vane
- 11 rotor blade
- 12 radially outer shaft end of the adjustable guide vane
- 13 radially inner shaft end of the adjustable guide vane
- 20 blade ring
- 21 inner cover band (shroud)
- 50 bearing element
- 51 reception areas for the shaft end of the adjustable guide vanes
- D rotation of the adjustable guide vane
- R rotational axis of the turbomachine
- S flow direction

The invention claimed is:

1. A turbomachine including:
an adjustable guide vane; and
a bearing element for the adjustable guide vane, the bearing element comprising:
   a porous matrix made of at least one chosen from carbon and graphite;
   at least one chosen from a metallic phase and a metal salt arranged at least partially inside a pore of the porous matrix, resulting in at least one chosen from a metal-infiltrated material and a metal-salt-infiltrated material; and
   a reception area for a shaft end of the adjustable guide vane, wherein the reception area includes a contact surface, and wherein the contact surface has neither a coating nor a fitted bushing.

2. The turbomachine according to claim 1, wherein the bearing element consists only of the porous matrix and the at least one chosen from the metallic phase and the metal salt.

3. The turbomachine according to claim 1, wherein the contact surface is self-lubricating.

4. The turbomachine according to claim 1, wherein the bearing element is formed as an inner cover band for a blade ring or connected to the inner cover band for the blade ring.

5. The turbomachine according to claim 1, wherein the bearing element an inflow surface for a seal.

6. The turbomachine according to claim 5, wherein the contact surface and the inflow surface are arranged at substantially opposite ends of the bearing element.

7. The turbomachine according to claim 1, wherein the metallic phase comprises at least one chosen from a non-ferrous metal, a light metal, a metal salt, and an alloy of these materials.

8. The turbomachine according to claim 1, wherein the porous matrix at least in a partial area has at least one chosen from a closed pore structure and an interconnected structure with open pores.

9. The turbomachine according to claim 1, wherein a ratio of thermal expansion coefficients of the porous matrix and the metallic phase is smaller than 0.6.

10. The turbomachine according to claim 1, wherein the at least one chosen from the metallic phase and the metal salt in the porous matrix is distributed inside the bearing element according to a load condition.

11. The turbomachine according to claim 1, wherein the bearing element is embodied as a section of a ring or as a full ring with bearings for a shaft end of the adjustable guide vane.

12. The turbomachine according to claim 1, wherein the bearing element is manufactured by a liquid infiltration process.

13. The turbomachine of claim 1, wherein the non-ferrous metal is at least one chosen from copper, silver, and antimony, wherein the light metal is at least one chosen from aluminum, non-heat-treated aluminum, and magnesium, and wherein the metal salt is a metallic phosphate.

14. A method for manufacturing a turbomachine, comprising:
providing:
   an adjustable guide vane; and
   a bearing element for the adjustable guide vane, the bearing element comprising:
      a porous matrix made of at least one chosen from carbon and graphite;
      at least one chosen from a metallic phase and a metal salt;
arranging the porous matrix inside an infiltration device, inserting the at least one chosen from the metallic phase and the metal salt into a pore of the porous matrix as an external pressure or an external force is being exerted; and
wherein the bearing element includes a reception area for a shaft end of the adjustable guide vane, wherein the reception area includes a contact surface, and wherein the contact surface has neither a coating nor a fitted bushing.

15. A turbomachine including:
an adjustable guide vane; and
a bearing element for the adjustable guide vane, the bearing element consisting only of:
   a porous matrix made of at least one chosen from carbon and graphite; and
   at least one chosen from a metallic phase and a metal salt arranged at least partially inside a pore of the porous matrix, resulting in at least one chosen from a metal-infiltrated material and a metal-salt-infiltrated material.

16. The turbomachine according to claim 15, wherein the bearing element is formed as an inner cover band for a blade ring or connected to the inner cover band for the blade ring.

17. The turbomachine according to claim 15, further comprising an inflow surface for a seal.

18. The turbomachine according to claim 17, further comprising:
   a reception area for a shaft end of the adjustable guide vane, wherein the reception area includes a contact surface, and wherein the contact surface has neither a coating nor a fitted bushing; and
   wherein the contact surface and the inflow surface are arranged at substantially opposite ends of the bearing element.

19. The turbomachine according to claim 15, wherein the metallic phase comprises at least one chosen from a non-ferrous metal, a light metal, a metal salt, and an alloy of these materials.

20. The turbomachine according to claim 15, wherein the porous matrix at least in a partial area has at least one chosen from a closed pore structure and an interconnected structure with open pores.

* * * * *